(12) United States Patent
Reial (10) Patent No.: US 7,826,515 B2
(45) Date of Patent: Nov. 2, 2010

(54) POSITIONING A MULTIPATH SEARCH WINDOW

(75) Inventor: Andres Reial, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 914 days.

(21) Appl. No.: 10/558,613

(22) PCT Filed: May 14, 2004

(86) PCT No.: PCT/EP2004/005345

§ 371 (c)(1),
(2), (4) Date: Sep. 21, 2006

(87) PCT Pub. No.: WO2004/107599

PCT Pub. Date: Dec. 9, 2004

(65) Prior Publication Data

US 2007/0041431 A1 Feb. 22, 2007

Related U.S. Application Data

(60) Provisional application No. 60/476,327, filed on Jun. 6, 2003.

(30) Foreign Application Priority Data

May 27, 2003 (EP) .................................. 03388038

(51) Int. Cl.
*H04B 1/00* (2006.01)
(52) U.S. Cl. ........................ 375/147; 370/342; 375/200; 375/206; 375/354
(58) Field of Classification Search .................. 375/147, 375/200, 206, 354; 370/342
See application file for complete search history.

(56) References Cited

U.S. PATENT DOCUMENTS

| 5,644,591 | A | 7/1997 | Sutton |
| 5,805,648 | A | 9/1998 | Sutton |
| 2001/0014116 | A1* | 8/2001 | Saito et al. .................. 375/148 |
| 2001/0046221 | A1* | 11/2001 | Ostman et al. .............. 370/335 |

FOREIGN PATENT DOCUMENTS

| EP | 0 951 148 A | 10/1999 |
| EP | 1 225 707 A | 7/2002 |
| WO | WO 99/57819 A | 11/1999 |
| WO | WO 01/76087 A | 10/2001 |

OTHER PUBLICATIONS

European Patent Office; International Search Report for PCt/WP2004/05345 dated Aug. 12, 2004.

* cited by examiner

*Primary Examiner*—Shuwang Liu
*Assistant Examiner*—Michael R Neff (57) ABSTRACT

Multipath components of a signal transmitted through a time-varying digital radio channel are received with individual delays ($\tau$) within a range ($\tau_1 \ldots \tau_M$) of possible delay values. The individual delays are estimated and a delay profile ($g(\tau_i)$) calculated repetitively. The method comprises searching repetitively for new multipath components in a search window constituting a subset of the possible delays, and positioning the search window based on a previous delay profile ($g(\tau_i)$). For each of a number of search window positions (k) a sum of power is determined for the multipath components located in the search window with that position, and the position of the search window is selected based on the determined sums of power. In this way the multipath detection is less influenced by the noise floor, and it is also effective for channels having a wide delay spread and/or significantly time-varying delay profiles.

3 Claims, 9 Drawing Sheets

POSITIONING A MULTIPATH SEARCH WINDOW

This application claims the benefit of U.S. Provisional Application No. 60/476,327, filed Jun. 6, 2003, the disclosure of which is fully incorporated herein by reference.

TECHNICAL FIELD OF THE INVENTION

The invention relates to a method of detecting multipath components in a time-varying fading radio channel in a digital wireless communications system in which individual multipath components of a signal transmitted through said channel are received with individual delays within a range of possible delay values, and wherein said individual delays are estimated and a delay profile calculated repetitively, the method comprising the steps of searching repetitively for new multipath components in a search window constituting a subset of said range of possible delays; and positioning said search window based on at least one previous delay profile. The invention further relates to a receiver having means for detecting multipath components in a time-varying fading radio channel.

DESCRIPTION OF RELATED ART

In wireless communications systems the physical channel between a transmitter and a receiver is typically formed by a radio link. As an example, the transmitter could be a base station, and the receiver could be a mobile station, or vice versa. In most cases the transmit antenna is not narrowly focused towards the receiver. This means that the transmitted signals may propagate over multiple paths. In addition to a possible direct path from the transmitter to the receiver, many other propagation paths caused by reflections from objects in the surroundings exist. Thus, the receiver may receive multiple instances of the same signal at different times, i.e. with different delays, because different portions of the signal are reflected from various objects, such as buildings, moving vehicles or landscape details.

These different portions of the signal are a cause of interference in the receiver. Depending on the time resolution of the transmission system and the instantaneous phase relationship, portions with similar propagation distances combine at the receiver and form a distinct multipath component. The effect of the combining depends on the instantaneous relationship of the carrier wavelength and distance differences, and it may thus for a given multipath component be either enhancing or destructive. In case of destructive interference, the combining leads to significant decrease of the magnitude, or fading, of the path gain for that path.

This interference is treated differently in different transmission systems. Many transmission systems try to reduce the effect of multipath propagation and fading by using receivers that combine the data symbol energy from all multipath components. In Code Division Multiple Access (CDMA) and Wideband Code Division Multiple Access (WCDMA) systems the energy of the different received portions of the signal may be utilized in the receiver by using a so-called RAKE receiver.

In these systems spreading and despreading is used. Data are transmitted from the transmitter side using a spread spectrum modulation technique wherein the data are scattered across a wide range of frequencies. Each channel is assigned a unique spreading code that is used to spread the data across the frequency range. The spreading code is a pseudo-random noise (PN) code and is composed of e.g. a binary sequence of 1's and 0's, called "chips", that are distributed in a pseudo-random manner and have noise-like properties. The number of chips used to spread one data bit, i.e. chips/bit, may vary, and it depends, at least in part, on the data rate of the channel and the chip rate of the system.

In the receiver the received signal must be despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above. The performance of a CDMA receiver is improved if the signal energy carried by many multipath components is utilized. This is achieved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate.

Thus the RAKE receiver requires knowledge of the multipath delays and the values of the channel impulse response for all paths. To achieve the best possible signal-to-noise ratio (SNR) at the output of the RAKE combiner, the signal energy from as many physical paths as possible should be collected. In addition, tracking as many different physical paths as possible (higher utilized diversity) significantly increases the robustness of reception, since this reduces the probability of a simultaneous deep fade of all paths, a phenomenon leading to serious and sometimes catastrophic degradation of the block error rate (BLER).

The structure of the propagation channel, i.e. the absolute and relative delays of the individual multipath components, does not remain constant over time. Due to relative movement of the transmitter, the receiver and the objects in their vicinity, the delays of existing paths change, old paths disappear and new paths appear. In addition, the frequency offset between the transmitter and receiver circuits gives rise to a slow clock drift, which manifests itself as a gradual movement of the whole delay profile along the time axis. To ensure proper operation of the RAKE receiver, the changing delays of all known multipath components should be tracked, and new paths should be discovered quickly after they appear.

Due to the physical channel structure it is, in most cases, the relative positions of the nearby objects that change. The path lengths of new paths are thus not very different from the path lengths of the existing paths. Further, the macro-structure of the channel (i.e. the number of mountains or groups of buildings that cause signal reflections) changes relatively infrequently. Therefore, most of the time the delays of newly appeared paths are relatively similar to those of the old, known paths, and thus they may be detected by searching in the same neighbourhood.

An approach to delay estimation in a RAKE receiver implementation could involve evaluating the impulse response of the channel over the whole range of possible delays of the channel. The resulting delay profile, which may be a complex delay profile (CDP) or a power delay profile (PDP), may then be subjected to peak detection, and the peak locations are reported to the RAKE receiver as the delay estimates. However, the processing and power consumption expenses of frequently executing this full path searching routine are usually prohibitive.

Therefore, typical implementations may use path searchers with observation windows shorter than the full search area. In addition, the path searcher resolution may be reduced and additional densely-sampled windows of despreaders may be used that produce higher-resolution estimates of certain areas of the delay profile. In any case, in a practical delay estimation system the path searcher stage is used periodically to re-scan the delay range with the purpose of detecting new paths.

When a general delay estimation algorithm is used, which is able to extract the path positions and find their delays with sufficient accuracy once they are discovered by the path searcher, it is a main task to position the path searcher window so that new paths will be included in the window. Since new paths will, with high probability, appear in the vicinity of the currently known paths in terms of their delays, although it is not known exactly where, the prevalent criterion of placing the path searcher window is usually to cover the currently known paths.

A current power delay profile may comprise a set of power values for a number of delay values. This set may represent the set of currently tracked paths, in which case the delay values will usually not be contiguous. It may also represent a contiguous region over which the path search is conducted. Other ways of representing the power delay profile are also possible. The task is then to determine a suitable start position for the path searcher window.

A typically used method for determining a suitable path searcher window position for the next path search activation is based on computing the center of gravity (COG), also known as the mean excess delay, of the presently known power delay profile estimate. Given the center of gravity estimate, the path searcher window is placed so that most of the channel power would be covered by the window. Because of the space loss, a typical shape of the power delay profile exhibits exponential decay, i.e. the energy is concentrated towards the beginning of the region of interest. For a reasonable coverage the window could thus be placed e.g. ⅓ ahead of and ⅔ behind the center of gravity value.

In the case of a compact true power delay profile and a high signal-to-noise ratio, the center of gravity gives a consistent and reliable estimate of the true energy concentration in the channel. However, when the energy in the channel is distributed over a wide delay spread, when the signal-to-noise ratio of the power delay profile is poor, and/or when the power delay profile used to compute the center of gravity is significantly time-varying due to fading, the center of gravity result tends to exhibit two types of problems.

First, the noise-induced component of the power delay profile values will cause a bias term which shifts the center of gravity result towards the average (non-power weighted) delay of all the entries of the power delay profile. The size of the bias term depends on how far from each other the true center of gravity and the "average delay" are separated, and on the signal-to-noise ratio. In many practical cases, the bias term may be large enough to shift the path searcher window away from significant portions of the true power delay profile.

To counteract the noise-induced bias effect, the power delay profile values may be thresholded, which will remove a certain fraction of the noise-only samples and reduce the bias. However, efficient noise removal assumes the use of a rather high threshold, which in turn may remove the channel components from the power delay profile as well, and thus distort the power delay profile. The noise effect may also be reduced by noise subtraction, where the average noise power in the power delay profile is estimated, and instead of the original power delay profile values, values reduced by the average noise power are used in the center of gravity computation. In this way the bias is reduced, but since the noise floor cannot be estimated exactly, it cannot be removed completely, and a residual bias effect remains.

Second, if the physical propagation channel has a long delay spread, compared to the length of the path searcher window, the window must be positioned precisely in order to include all clusters of energy in the power delay profile. Any temporary fluctuation in the power delay profile seen by the center of gravity algorithm, e.g. due to fading, may offset the computed center of gravity value, and the window will be placed so that some of the true paths will be located outside the window. In subsequent center of gravity computations only the remaining paths are used, and the window shifts away from the lost (but physically still present) paths. This leads to increased interference levels, reduced signal-to-interference ratio and reduced diversity, and in some cases it can cause loss of synchronization with the transmitter side. In essence, the cause of these problems is the fact that the center of gravity parameter removes a lot of the information about the power delay profile—it is a much simplified measure of the energy distribution. Although this simplification may be desirable in some cases, it also leads to a significant loss of robustness.

Therefore, it is an object of the invention to provide a method of detecting multipath components that is less influenced by the average noise floor of the delay profile, and which is also effective for channels having a wide delay spread and/or channels with significantly time-varying delay profiles.

SUMMARY

According to the invention the object is achieved in that the method comprises the steps of determining for each of a number of different search window positions a sum of power for those multipath components of at least one previous delay profile that are located in the search window with that position; and selecting the position of the search window, in which the search for new multipath components is performed, based on the determined sums of power.

By selecting the search window position based on the sums of power in the previous delay profile it is ensured that a high noise level does not shift the position of the search window as it is the case for center of gravity method, because a bias term caused by the noise does not affect the relative levels of the power sums. Further, if a path should be located outside the window in one search for new multipath components in channels having a wide delay spread, this fact will not affect subsequent searches, since the position of the window in one search is not as strictly determined by the position of the window in previous searches.

In addition the method allows maintaining proper path searcher window positioning also when the available power delay profile is an instantaneous version of the fading channel response.

This criterion for path searcher window placement directly takes into account the quantity of interest, i.e. the amount of signal power due to known paths captured by the window. No heuristically determined offset for the window start position is necessary, making the method suitable for arbitrary channel models. Further, pathological situations are avoided where the center of gravity method could place the window so that one or more path clusters are excluded, simply due to the loss of information in the computation process.

Especially when the window position having the highest sum of power is selected as the search window in which the search for new multipath components is performed, it is ensured that the search window position is not affected by a high noise level.

In one embodiment the step of determining a sum of power for each of said search window positions is performed by first determining the sum of power for a search window starting with the lowest delay value in said range of possible delays, and then repeatedly performing the step of determining the sum of power for a search window of unchanged size, the position of which is decided by moving the previous search window to a position including the delay value incrementally higher than the delay values of the previous search window, until the highest delay value in said range of possible delays has been included. In this way, it is ensured that the power sum is determined for all possible windows in a natural order.

When the sum of power for each search window is determined by adding to the power of the previous search window the power of the delay value that is included in the present search window, but was not included in the previous search window, and subtracting the power of any delay values that were included in the previous search window, but are not included in the present search window, it is achieved that each new power sum is obtained from the previous sum by performing only a few additions, i.e. one addition and only a few, if any, subtractions, to be more precise. In this way the computational complexity is not significantly larger than that associated with the center of gravity computation.

In an expedient embodiment the possible delay values constitute a contiguous sequence of equally spaced samples. In this case, the captured power is computed by effectively shifting the window, requiring two additions to obtain the power for the next position, given the power at the previous position.

When the method further comprises the step of calculating a modified delay profile by combining the power of a number of neighbouring delay values, the number of window positions to be evaluated may be reduced. The use of this coarse version of the original power delay profile further reduces the computational complexity of the method.

In an alternative embodiment the possible delay values consist of a limited number of sparse samples. These samples could typically be the currently tracked or detected paths. Due to the limited number of samples there will be fewer possible window positions, and thus the number of computations will also be reduced.

When the method further comprises the step of calculating the at least one previous delay profile as an averaged delay profile generated from a number of repetitively calculated instantaneous delay profiles, a more robust algorithm is achieved.

Expediently, the method may further comprise the step of thresholding said at least one previous delay profile before said sums of power are determined.

When the method further comprises the step of searching occasionally for new multipath components outside said search window, paths that have appeared far from the presently tracked paths can also be detected.

When the method further comprises the step of including an artificial multipath component in said at least one previous delay profile at a delay value on which a multipath component from an earlier delay profile is significantly decreased in the at least one previous delay profile, further protection against erratic window placement decisions is provided, which could otherwise result in window shifts and potential loss of paths. In this way it is possible to ensure that the previously active paths that may be temporarily faded will be included in the power capture criterion. This artificial multipath component will guide the window placement even when the particular channel realization is strongly faded. Thus it is possible to maintain the window position even when some paths have faded.

As mentioned, the invention further relates to a receiver having means for detecting multipath components in a time-varying fading radio channel in a digital wireless communications system in which individual multipath components of a signal transmitted through said channel are received with individual delays within a range of possible delay values, the receiver comprising means for estimating said individual delays and calculating a delay profile repetitively; and means for searching repetitively for new multipath components; said searching means being adapted to perform each search for new multipath components in a search window constituting a subset of said range of possible delays; and position said search window based on at least one previous delay profile.

When the receiver is further adapted to determine for each of a number of different search window positions a sum of power for those multipath components of said at least one previous delay profile that are located in the search window with that position; and select the position of the search window, in which the search for new multipath components is performed, based on said determined sums of power, a receiver is provided in which the detection of multipath components is less influenced by the average noise floor of the delay profile, and which is also effective for channels having a wide delay spread and/or channels with significantly time-varying delay profiles.

Especially when the receiver is adapted to select the window position having the highest sum of power as the search window in which the search for new multipath components is performed, it is ensured that the search window position is not affected by a high noise level.

In one embodiment the receiver is further adapted to determine the sum of power for each of said search window positions by first determining the sum of power for a search window starting with the lowest delay value in said range of possible delays, and then repeatedly performing the step of determining the sum of power for a search window of unchanged size, the position of which is decided by moving the previous search window to a position including the delay value incrementally higher than the delay values of the previous search window, until the highest delay value in said range of possible delays has been included. In this way, it is ensured that the power sum can be determined for all possible windows in a natural order.

When the receiver is further adapted to determine the sum of power for each search window by adding to the power of the previous search window the power of the delay value that is included in the present search window, but was not included in the previous search window, and subtracting the power of any delay values that were included in the previous search window, but are not included in the present search window, it is achieved that each new power sum can be obtained from the previous sum by performing only a few additions, i.e. one addition and only a few, if any, subtractions, to be more precise. In this way the computational complexity is not significantly larger than that associated with the center of gravity computation.

In an expedient embodiment the possible delay values constitute a contiguous sequence of equally spaced samples. In this case, the captured power can be computed by effectively shifting the window, requiring two additions to obtain the power for the next position, given the power at the previous position.

When the receiver is further adapted to calculate a modified delay profile by combining the power of a number of neighbouring delay values, the number of window positions to be evaluated may be reduced. The use of this coarse version of the original power delay profile further reduces the computational complexity of the method.

In an alternative embodiment the possible delay values consist of a limited number of sparse samples. These samples could typically be the currently tracked or detected paths. Due to the limited number of samples there will be fewer possible window positions, and thus the number of computations will also be reduced.

When the receiver is further adapted to calculate the at least one previous delay profile as an averaged delay profile generated from a number of repetitively calculated instantaneous delay profiles, a more robust algorithm is achieved.

Expediently, the receiver is further adapted to threshold said at least one previous delay profile before said sums of power are determined.

When the receiver is further adapted to search occasionally for new multipath components outside said search window, paths that have appeared far from the presently tracked paths can also be detected.

When the receiver is further adapted to include an artificial multipath component in said at least one previous delay profile at a delay value on which a multipath component from an earlier delay profile is significantly decreased in the at least one previous delay profile, further protection against erratic window placement decisions is provided, which could otherwise result in window shifts and potential loss of paths. In this way it is possible to ensure that the previously active paths that may be temporarily faded will be included in the power capture criterion. This artificial multipath component will guide the window placement even when the particular channel realization is strongly faded. Thus it is possible to maintain the window position even when some paths have faded.

Further, the receiver may expediently be adapted for use in a Wideband Code Division Multiple Access system.

BRIEF DESCRIPTION OF THE DRAWINGS

The invention will now be described more fully below with reference to the drawings, in which.

DETAILED DESCRIPTION OF EMBODIMENTS

Figure 1:
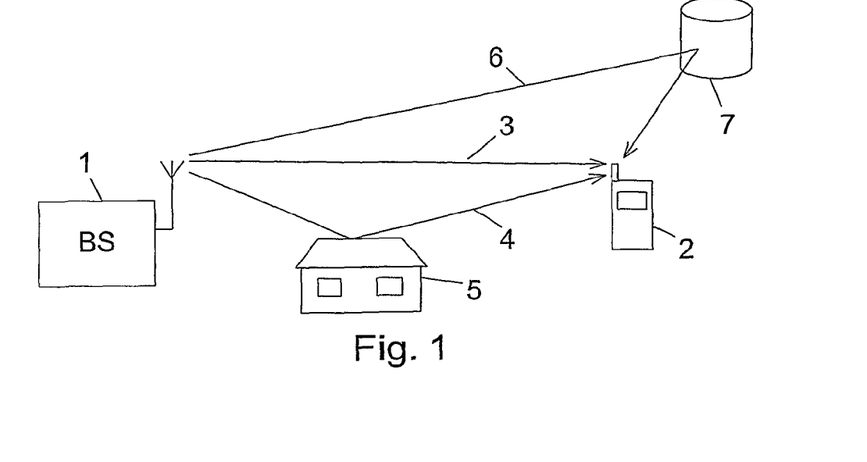
FIG. 1 shows an example of multiple paths between a base station and a mobile station.

FIG. 1 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different delays.

Figure 2:
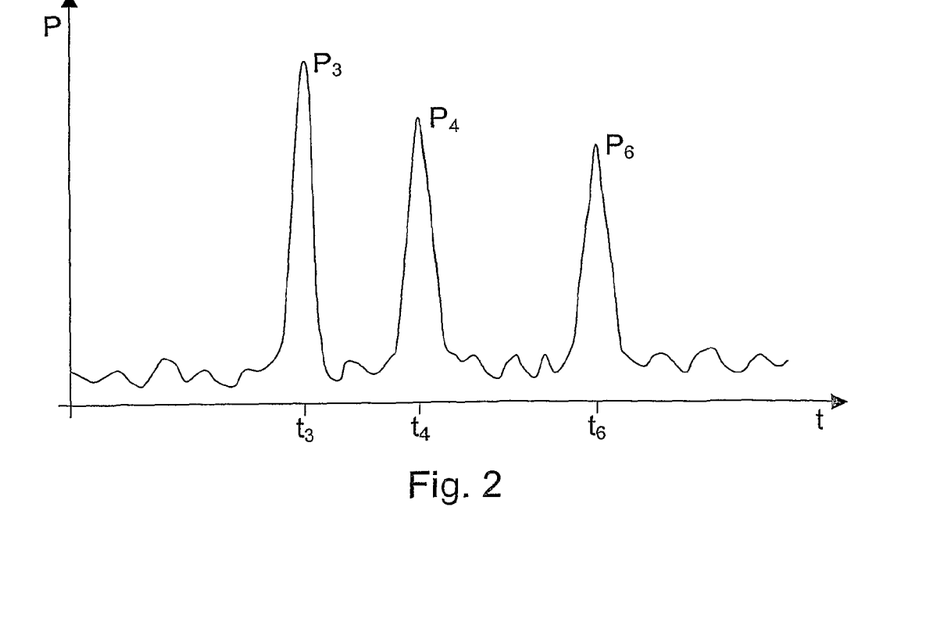
FIG. 2 shows a power delay profile for the paths illustrated in FIG. 1.

Thus, if a pilot signal is transmitted from the base station 1, the power P received at the mobile station 2 as a function of the time t may look as illustrated in FIG. 2, which shows an example of a power delay profile. The power delay profile shows all signals received at the mobile station, including noise and interference signals. However, only the peaks in the power delay profile correspond to the multipath components of the transmitted signal. Together these peaks form the impulse response of the channel. In FIG. 2 the peak $P_3$ received at the time $t_3$ corresponds to the direct path 3 in FIG. 1, while the peaks $P_4$ and $P_6$ received at the times $t_4$ and $t_6$, respectively, correspond to the indirect paths 4 and 6 in FIG. 1. Thus, as an example, it is seen that the delay of the path 6 (corresponding to the peak $P_6$) is larger than the delay of the path 3 (corresponding to the peak $P_3$).

The mobile station 2 and the base station 1 may be adapted for use in e.g. a Code Division Multiple Access (CDMA) system or a Wideband Code Division Multiple Access (WCDMA) system, and in that case the mobile station 2 may use a RAKE receiver, which is capable of identifying and tracking the various multipath signals for a given channel. In this way the energy or power of several multipath components can be utilized in the receiver. As mentioned above, this may be achieved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate. Thus the RAKE receiver requires knowledge of the multipath delays and the values of the channel impulse response for all paths. The signal energy from as many physical paths as possible should be collected.

Although reference is here made to a RAKE receiver in a mobile station, it should be noted that the algorithms described below may be used at any CDMA receiver, i.e. in a mobile station or a base station, and the transmission may be uplink or downlink.

Since the structure of the propagation channel does not remain constant over time, the delays of existing paths change, old paths disappear and new paths appear. The changing delays of all known multipath components should be tracked, and new paths should be discovered quickly after they appear. However, most of the time the delays of newly appeared paths are relatively similar to those of the old, known paths, and thus they may be detected by searching in the same neighbourhood.

Figure 3:
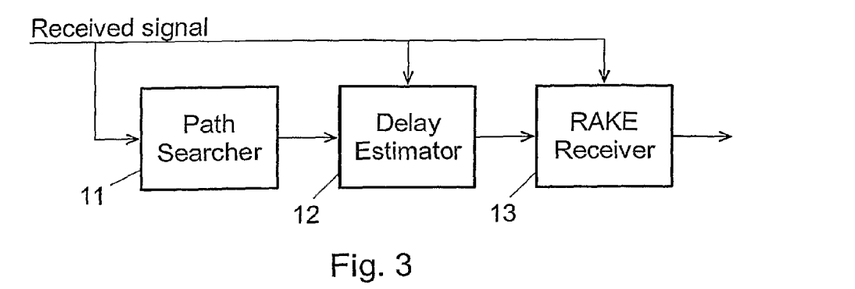
FIG. 3 illustrates the use of a path searcher in combination with a RAKE receiver.

In order to estimate the path delays in the RAKE receiver, the impulse response of the channel could be evaluated over the whole range of possible delays in the channel, and the resulting delay profile could then be subjected to peak detection and the peak locations reported to the RAKE receiver as the delay estimates. However, the processing and power consumption of executing such a full path searching routine frequently is usually so high that it cannot be realized in a practical system. Therefore, infrequently activated limited-range path searchers are typically used for detecting new paths and, in some implementations, for re-detecting temporarily faded existing paths. This is illustrated in FIG. 3, in which a path searcher 11 is used in combination with a RAKE receiver 13.

The path searcher 11 is a device that periodically computes instantaneous impulse response estimates (complex or power) over a range of delays that only constitutes a fraction of the maximum delay spread allowed by the system. This reduced range of delays is also called a path search window. The complex or power values for a given delay value may be estimated e.g. by correlating the received data for pilot symbols with an appropriately delayed copy of the spreading sequence. Since the path searcher 11 is mainly used only to detect the existence of paths, its output resolution may be lower than that required by the RAKE receiver 13. The RAKE receiver 13 itself uses a general delay estimation algorithm 12, which is able to extract the path positions and find their delays with sufficient accuracy, once they are discovered by the path searcher 11. Thus an important task in the path searcher is to position the path searcher window so that new paths can be expected to be included in the window. As mentioned, new paths will with high probability appear in the vicinity of the currently known paths, and thus the path search window for a new search is normally placed so that it covers the currently known paths. This can be done in different ways. One method is the center of gravity method, but as mentioned this method suffers from a number of problems.

Figure 4:
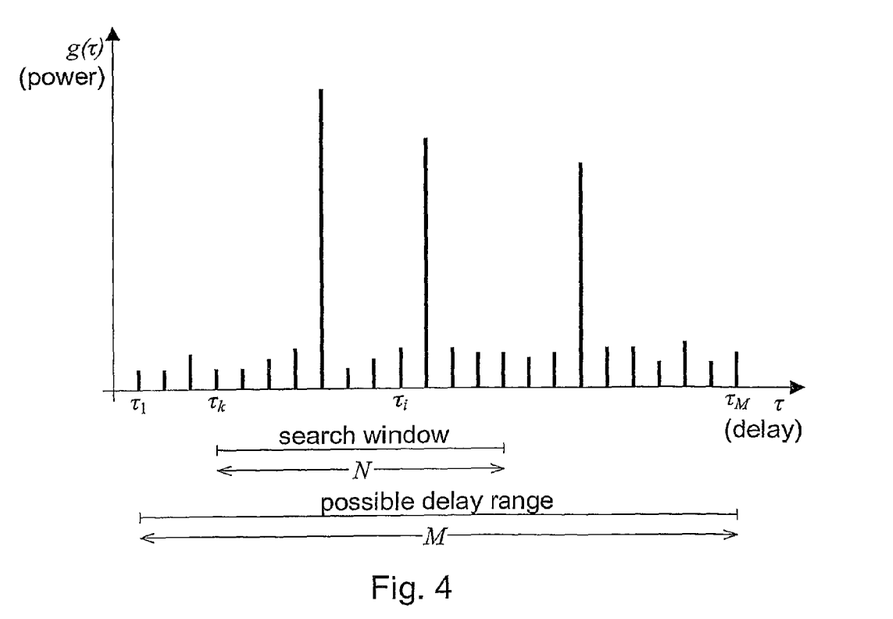
FIG. 4 shows a sampled power delay profile corresponding to the profile shown in FIG. 2.

Typically, the delay profile of the received signal will not be available as a continuous curve as the one illustrated in FIG. 2. Instead, it will consist of a number of sample values. This is illustrated in FIG. 4, which shows a sampled power delay profile corresponding to the continuous delay profile shown in FIG. 2. For each delay value $\tau_i$, where $i \in [1,M]$, i.e. the full possible delay range, the corresponding power value $g(\tau_i)$ is shown. In this case the available estimates of the power delay profile constitutes a contiguous sequence of equally spaced samples, $\tau_i = \tau_0 + i\Delta\tau$.

In the well known center of gravity method, a center of gravity is computed for the presently known estimate of the power delay profile according to the equation $$C = \frac{\sum_i \tau_i g(\tau_i)}{\sum_i g(\tau_i)},$$

and the search window for the next search is placed around this value, e.g. ⅓ ahead of and ⅔ behind the computed center of gravity value.

In the following a method with improved robustness is suggested according to which the path search window is positioned so that maximal possible amount of presently known path power is included within the window range. The power capture is computed by summing the power of all the known power delay profile elements that would be covered by the window at a particular position, and the window position with the largest sum of powers will be chosen.

Generally, when the power delay profile information $g(\tau_i)$ is given for delays $\tau_i$, where $\tau \in [1,M]$, the algorithm for placing a path searcher window of length N may be expressed as a series of operations in which the captured power $P_k$ is computed for each of the windows having start positions $k \in [1,M-N+1]$:

$$P_k = \sum_{i=1}^{N} g(\tau_{k+i}),$$

and the path search window position $I=k_{max}$ is chosen, such that $$P_{k_{max}} = \max_k P_k.$$

Figure 5:
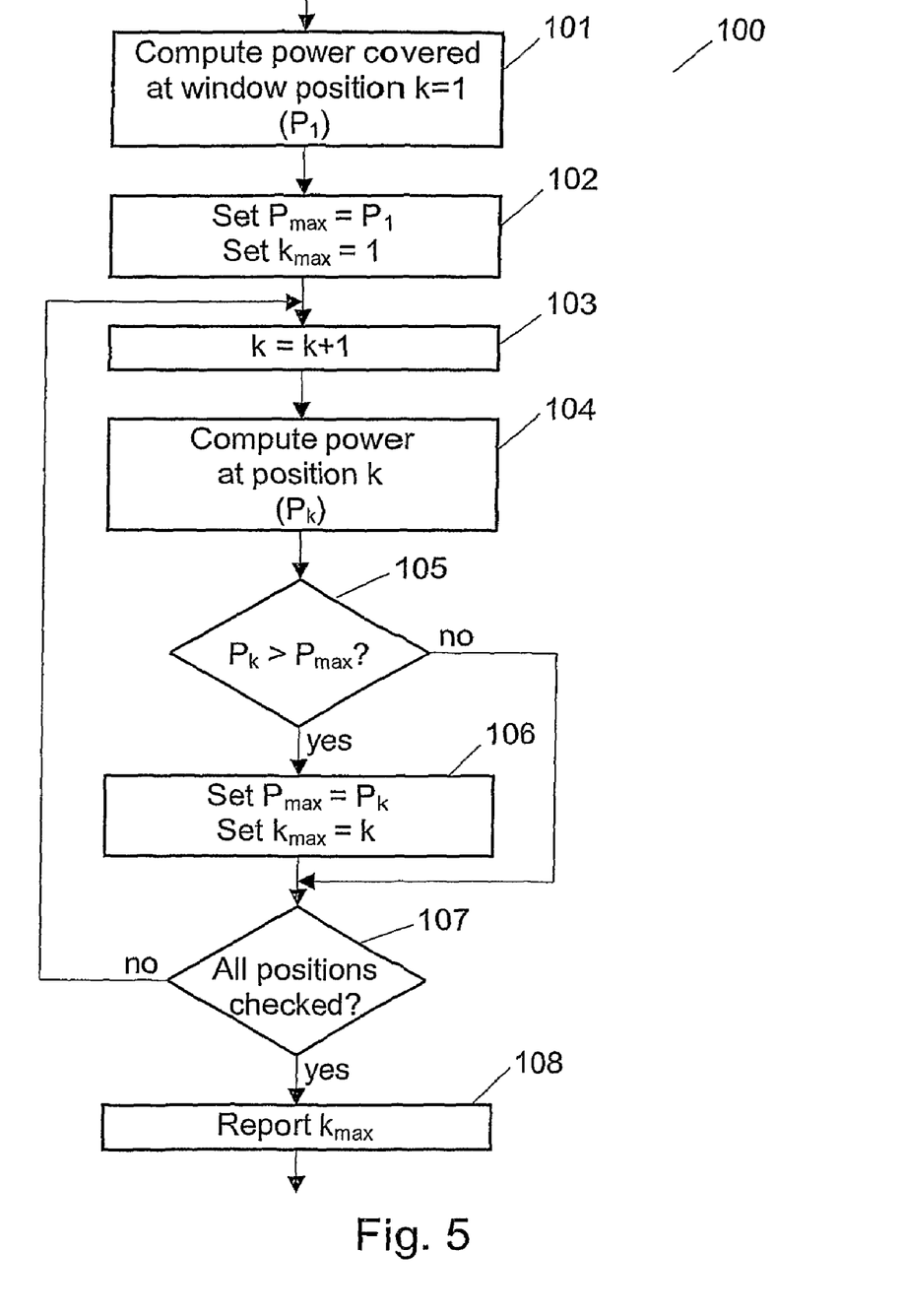
FIG. 5 shows a flow chart illustrating the steps of a method according to the invention.

This is also illustrated in the flow chart 100 in FIG. 5. In step 101 the sum of power covered by the first window position (i.e. k=1) is calculated as $$P_1 = \sum_{i=1}^{N} g(\tau_i),$$

and in step 102 this value is temporarily chosen as the highest power sum $P_{max}$. In step 103, which is the first step of a loop, k is incremented to indicate the next possible start position of the window, and the power sum $P_k$ corresponding to this start position is then computed in step 104 according to the equation mentioned above. If the new value $P_k$ is higher than $P_{max}$ (step 105), this value is now chosen as $P_{max}$ (step 106). If the power sum for all possible start positions has now been computed (step 107), the window position corresponding to the highest value is reported (step 108) as the best window position I=k* for the next search for new paths. Otherwise, steps 103 to 107 are repeated until all sums have been computed.

The computation of the sum of power covered by each possible position of the search window (step 104) can be performed in different ways. One efficient implementation of the algorithm slides the window sequentially across the possible positions, and the captured power for each new position is computed by taking the sum of powers in the previous position, adding the elements of the power delay profile that are included in the present position but were not included in the previous position, and subtracting the elements of the power delay profile that were included in the previous position but are no longer included in the present position. In this way the computational complexity is not significantly larger than that associated with the center of gravity computation.

When the available estimate of the power delay profile constitutes a contiguous sequence of equally spaced samples ($\tau_i = \tau_0 + i\Delta\tau$), e.g. the full-range power delay profile estimate as it is shown in FIG. 4, the power capture is efficiently computed as described below and illustrated in the flow chart 200 in FIG. 6.

Again, the sum of power covered by the first window position (i.e. k=1) is calculated in the first step, which is here step 201, as $$P_1 = \sum_{i=1}^{N} g(\tau_i).$$

In step 202 this value is temporarily chosen as the highest power sum $P_{max}$ by setting $P_{max}=P_1$ and $k_{max}=1$. In step 203, which is the first step of a loop, k is incremented (k=k+1) to indicate the next possible start position of the window. The steps of this loop are executed for all start positions k∈[2,M−N+1] as illustrated with the series of window positions shown in FIG. 7, which corresponds to FIG. 4 with the exception that the series of windows is shown. Since the window is moved only one position (i.e. $\Delta\tau$) between each calculation of the power sum, the next power sum can easily be calculated by adding only one power value to the previous sum and subtracting another one. Thus in step 204 the next element ($g(\tau_{k+N-1})$) is added to the previous sum, and in step 205 the element ($g(\tau_{k-1})$) that should no longer be included is subtracted. This means that each power sum $P_k$ is calculated as $P_k = P_{k-1} - g(\tau_{k-1}) + g(\tau_{k+N-1})$.

The remaining steps are similar to those in FIG. 5. Thus, if the new value $P_k$ is higher than $P_{max}$ (step 206), this value is now chosen as $P_{max}$ (step 207) by setting $P_{max}=P_k$ and $k_{max}=k$. If the power sum for all possible start positions has now been computed (step 208), the window position corresponding to the highest value is reported (step 209) as the best window position $I=k_{max}$ for the next search for new paths. Otherwise, steps 203 to 208 are repeated until all sums have been computed.

This algorithm assumes that the delays $\tau_i$ are ordered, which in practice is always the case when a long-range power delay profile is maintained.

Figure 8:
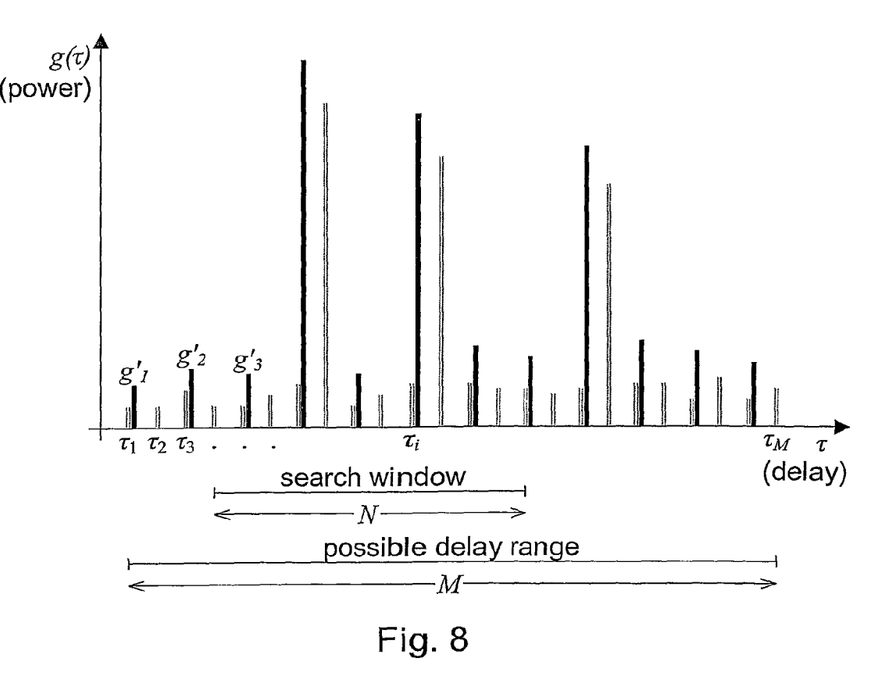
FIG. 8 shows an example of a power delay profile that is recomputed by combining neighbouring delay values.

Since the path searcher window placement does not need to be extremely precise, the original power delay profile $g(\tau_i)$ (which is often given at chip- or sub-chip-resolution), e.g. corresponding to FIG. 4, may be re-computed to a coarser scale by summing L neighbouring bins $$g'_l = \sum_{i=1}^{L} g(\tau_{(l-1)L+i})$$

to reduce the number of window positions to be considered. It is then the coarse power delay profile $g'_l$ that will be processed as described above, which will further reduce the computational complexity of the method. An example of this is shown in FIG. 8 in which the power delay profile of FIG. 4 is re-computed with L=2. The original power delay profile is shown with dashed lines while the re-computed profile is shown with full black lines. Since L=2, the values of the coarse (re-computed) delay profile are calculated as $$g'_l = \sum_{i=1}^{2} g(\tau_{(l-1)2+i}),$$

i.e. $g'_1 = g(\tau_1) + g(\tau_2)$, $g'_2 = g(\tau_3) + g(\tau_4)$, etc.

Figure 9:
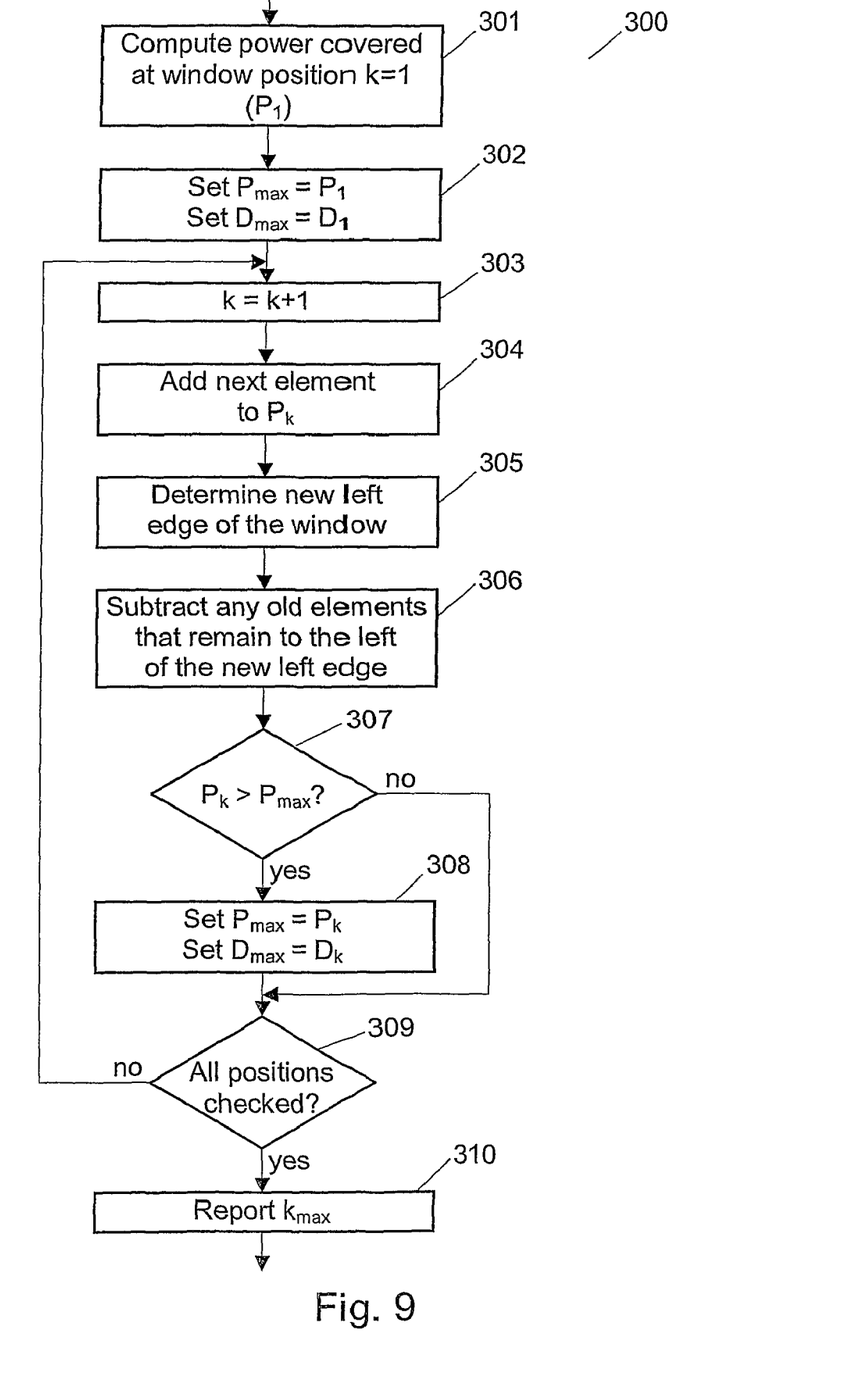
FIG. 9 shows a more detailed flow chart for the situation where the power delay profile consists of a limited number of sparse samples.
Figure 10:
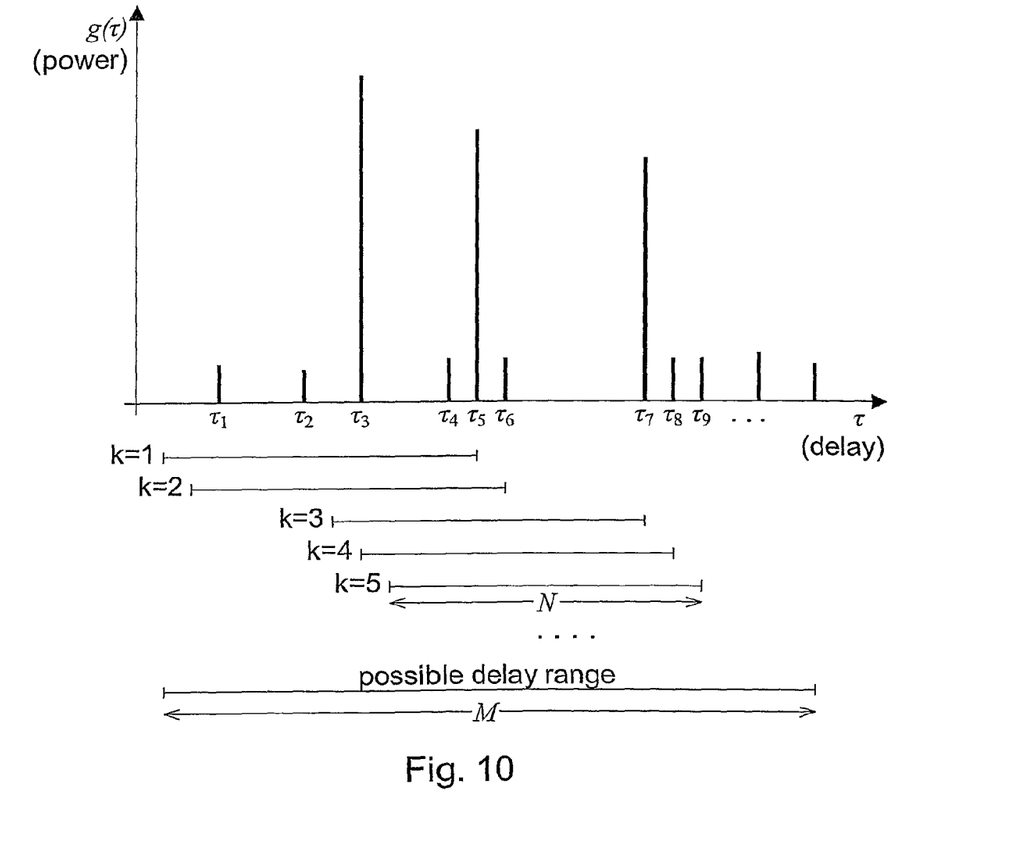
FIG. 10 shows how the windows are positioned according to the flow chart in FIG. 9.

In the examples mentioned above, the available estimate of the power delay profile constituted a contiguous sequence of equally spaced samples ($\tau_i = \tau_0 + i\Delta d$). However, the available estimate of the power delay profile may instead consist of only a limited number of samples over the possible delay range. Thus, instead of a contiguous power delay profile we have a sparse power delay profile. As examples, this limited number of samples could be the currently tracked or detected paths, or it could be all sample values above a certain threshold. In this case the power capture may efficiently be computed as described below and illustrated in the flow chart 300 in FIG. 9. An example of such a delay profile is shown in FIG. 10.

Also here, the sum of power covered by the first window position (i.e. k=1) is calculated in the first step, which is here step 301. However, here this sum of power is computed differently. First, if the delay values $\tau_i$ are not ordered, they are sorted in ascending order. Then the set of delays that would be covered by the path searcher window at position 1, i.e. $D_1 = \{\tau_i : \tau_i \in [1,N]\}$, is determined. This is illustrated with the window marked k=1 in FIG. 10. Then the power at this first window position is calculated as $P_1 = \sum_{i:\tau_i \in D_1} g(\tau_i)$.

In step 302 this value is temporarily chosen as the highest power sum $P_{max}$ by setting $P_{max}=P_1$ and $D_{max}=D_1$. In step 303, which is the first step of a loop, k is incremented (k=k+1) to indicate the next possible start position of the window. Since the samples are not contiguous, the next possible start position of the window is determined in a different way. If there exists a delay such that $\tau_m > \max D_{k-1}$, this next delay is included in the set of delays, and delays (if any) that are less than $\tau_m - N+1$ are removed from the set. This is illustrated in FIG. 10. The first window position (k=1) covers the delays $\tau_1$, $\tau_2, \tau_3, \tau_4$ and $\tau_5$. The next window position (k=2) is positioned such that the next delay, i.e. $\tau_6$, is included, and it is seen that in this case no delays are subtracted from the set of delays, because the delay $\tau_1$ is still included in the new window position. Next time $\tau_7$ is included (k=3), and it is seen that two delays ($\tau_1$ and $\tau_2$) are subtracted from the set. Thus each time a new delay is included, and since the length of the window is kept unchanged, those delays, if any, that are located to the left of the new left edge of the window are subtracted from the set. This means that the new set of delays is defined as $D_k = D_{k-1} \cup \{\tau_m\} \setminus \{\tau_i : \tau_i < \tau_m - N+1\}$.

Thus, in step 304 the power of the next delay element is added to the previous power sum. In step 305 the new left edge of the window is determined as described above, and in step 306 the power of the elements, if any, that should no longer be included is subtracted. The result is that the new power sum is $P_k = \sum_{i:\tau_i \in D_k} g(\tau_i)$ Alternatively, the window could also be moved so that one delay value at the left edge is subtracted each time, and those new delay values, if any, located within the new right edge are included. Further marginal computational savings may be realized by skipping the computation of $P_k$ when one more path to the right of the window position may be added to the window without excluding any presently included paths.

Figure 6:
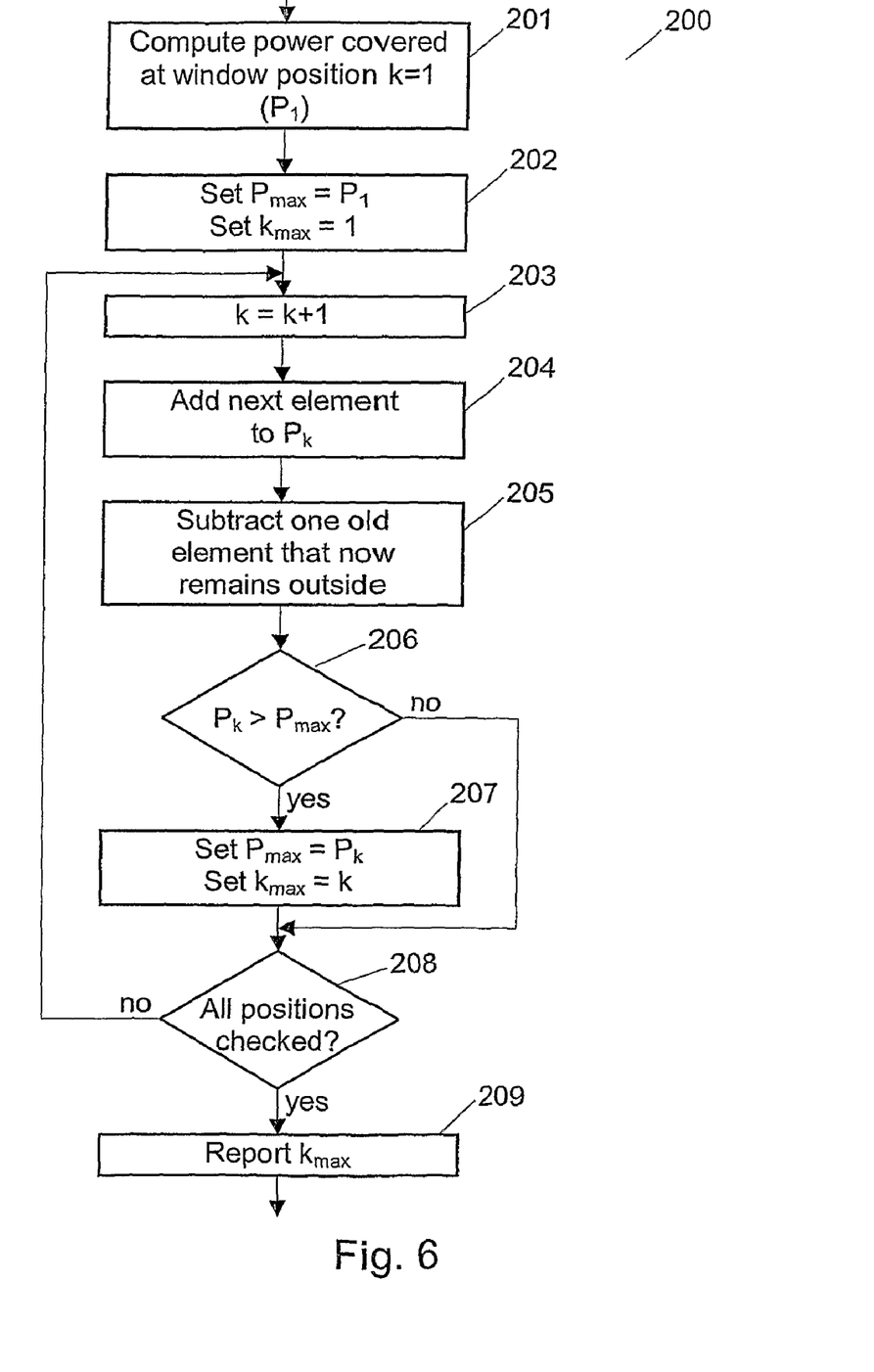
FIG. 6 shows a more detailed flow chart for the situation where the power delay profile constitutes a contiguous sequence of equally spaced samples.
Figure 7:
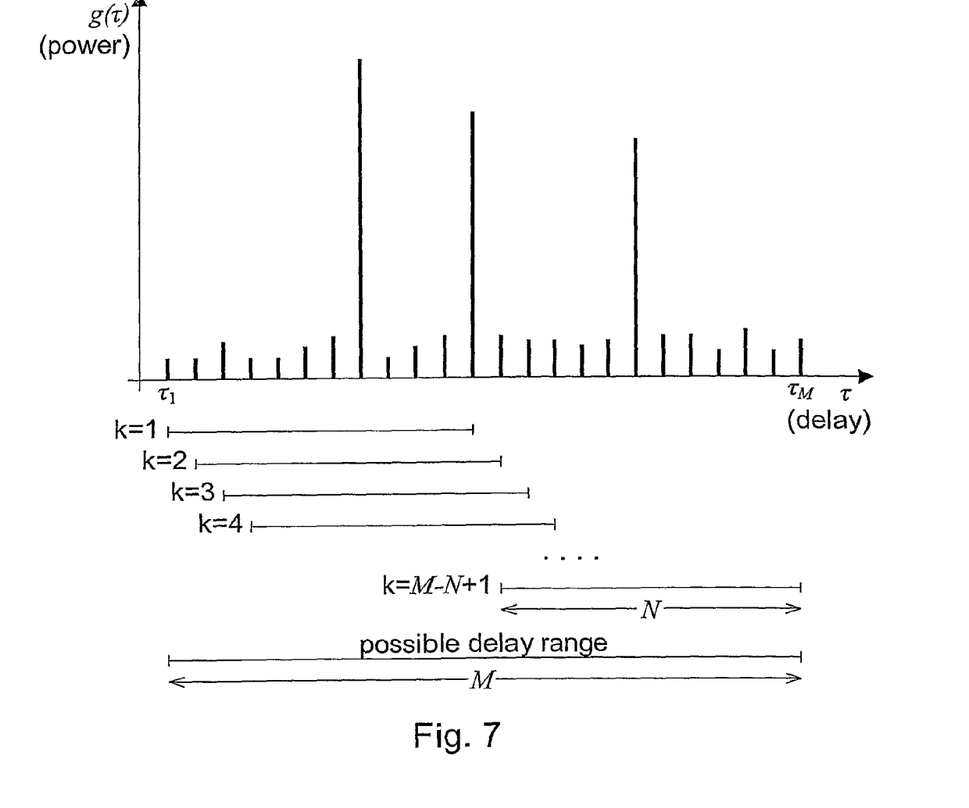
FIG. 7 shows how the windows are positioned according to the flow chart in FIG. 6.

The following steps are similar to those in FIGS. 5 and 6. Thus, if the new value $P_k$ is higher than $P_{max}$ (step 307), this value is now chosen as $P_{max}$ (step 308) by setting $P_{max}=P_k$ and $D_{max}=D_k$. If the power sum for all possible start positions has now been computed (step 309), the window position corresponding to the highest value is reported (step 310) as the best window position $I=k_{max}$, where $k_{max}$ is the k for which $D_k = D_{max}$, for the next search for new paths. Otherwise, steps 303 to 309 are repeated until all sums have been computed. However, since the samples are not contiguous, the window having the highest sum of power is not necessarily placed symmetrically around the set of delays covered by that window, and the position may therefore be adjusted accordingly so that equal space is left around the extreme delays included in that window, i.e. the window start position is selected as:

$$I = \min_{\tau_i \in D_{max}} i - \frac{N - \left(\max\limits_{\tau_i \in D_{max}} i - \min\limits_{\tau_i \in D_{max}} i\right)}{2}.$$

In the examples described above, the window placement may be based on either averaged or instantaneous path powers $g(\tau_i)$. The power delay profile may be averaged over a number of cycles to ensure that temporarily faded paths are still taken into consideration in the calculation of the next position of the path searcher window. Using path powers averaged across fading provides the highest robustness. However, when the power delay profile $g(\tau_i)$ is not averaged over several fading cycles, the instantaneous power delay profile may differ significantly from one evaluation to the next.

Figure 11:
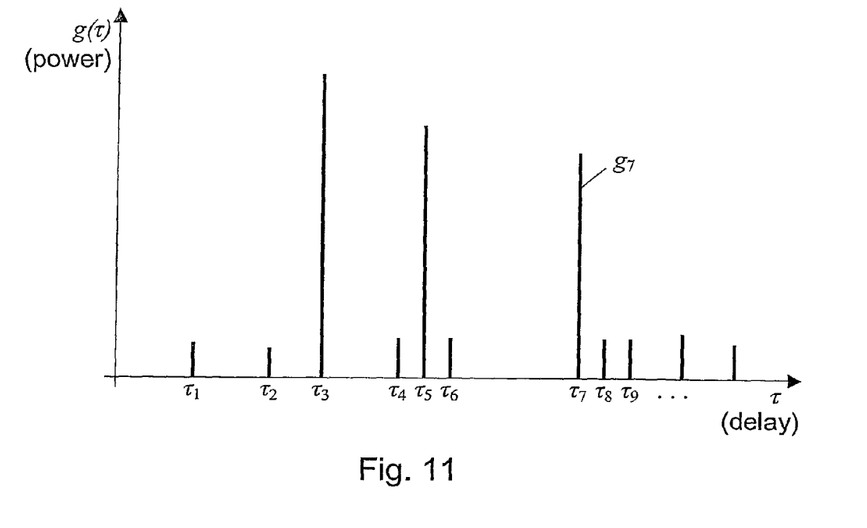
FIG. 11 shows a power delay profile having three strong paths.
Figure 12:
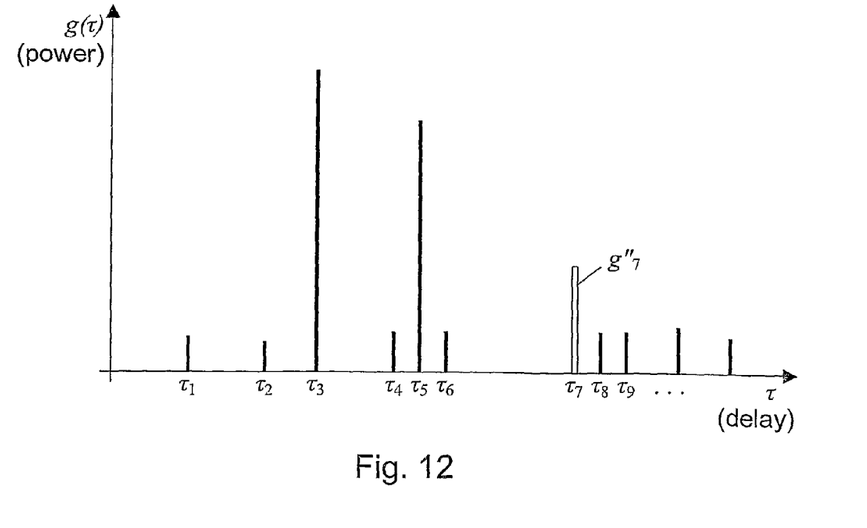
FIG. 12 shows the power delay profile of FIG. 11 wherein one of the strong paths has faded and has been replaced by a "pilot path".

To avoid erratic window placement decisions, resulting in window shifts and potential loss of paths, especially when sparse versions of the power delay profile are used, it is possible to allow for a simple incorporation of "memory" from earlier path searcher runs. To ensure that the earlier active paths that may be temporarily faded will be included in the power capture criterion, small "pilot paths" may be included in the power delay profile at positions where the earlier strong paths were located. This is illustrated in FIGS. 11 and 12. FIG. 11 shows an earlier power delay profile in which path $g_7$ is one of the strong paths. In the power delay profile of FIG. 12 this path has now been decreased (faded), and to compensate for this fading a "pilot path" $g''_7$ is inserted into the delay profile to avoid that the window is placed in an erroneous position. The "pilot path" magnitude should be sufficiently large to be visible above the noise floor. In this way these "pilot paths" will guide the window placement while the particular channel realization is strongly faded. At the same time, having a relatively low magnitude compared to the dominant paths, they will not affect the window placement significantly when new strong paths appear elsewhere, mandating relocation of the path searcher window. The "pilot paths" will be removed once the path searcher window moves, so that they will fall outside the window range Alternatively, the power delay profile may be averaged over a number of cycles to ensure that temporarily faded paths are still taken into consideration in the calculation of the next position of the path searcher window.

The method described above is computationally efficient. It is only marginally more demanding than the center of gravity computation. For a contiguous power delay profile each delay position is manipulated twice, just as in the center of gravity computation; the only added operation is the maximal power comparison at each step. For a sparse power delay profile a sorting operation is added in case the delays are not already ordered. In conjunction with adding each new path, comparisons of the currently covered delays with the window boundary are made, but the total complexity remains strictly linear since no random searches are required. Given the infrequent computation of the path searcher window position, the additional computation compared to the center of gravity method is negligible.

Several variations of the embodiments described above are possible, and a few will be mentioned here.

A complex delay profile may be used instead of a power delay profile, in which case the power of each delay profile element is found by multiplying the complex coefficient by its complex conjugate.

The path searcher window placement algorithm may be completed by conducting occasional searches outside the positions returned by the method described above in order to detect paths that have appeared far from the presently tracked paths.

Further, the power delay profile may be thresholded before the power capture computations.

Although a preferred embodiment of the present invention has been described and shown, the invention is not restricted to it, but may also be embodied in other ways within the scope of the subject-matter defined in the following claims.

What is claimed is:

1. A method of detecting multipath components in a time-varying fading radio channel in a digital wireless communications system, comprising:
   receiving individual multipath components of a signal transmitted through the channel with individual delays ($\tau_i$) within a range ($\tau_1 \ldots \tau_M$) of possible delay values, where for each individual delay ($\tau_i$), i is an element of [1, M], with [1, M] being the full possible delay range;
   estimating the individual delays;
   calculating a delay profile ($g(\tau_i)$) repetitively and including during such calculation, an artificial multipath component ($g''_7$) in the at least one previous delay profile at a delay value ($\tau_7$) on which a multipath component from an earlier delay profile is significantly decreased in the at least one previous delay;
   searching repetitively for new multipath components in a search window constituting a subset of the range of possible delays;
   positioning the search window based on at least one previous delay profile ($g(\tau_i)$);
   determining for each of a number of search window positions (k), a sum of power ($P_k$) for those multipath components of the at least one previous delay profile that are located in the search window with that position; and
   selecting the position of the search window, in which the search for new multipath components is performed, based on the determined sums of power ($P_k$).

2. A receiver adapted to detect multipath components in a time-varying fading radio channel in a digital wireless communications system in which individual multipath components of a signal transmitted through the channel are received with individual delays ($\tau$) within a range ($\tau_1 \ldots \tau_M$) of possible delay values, where for each individual delay ($\tau_i$), i is an element of [1, M], with [1, M] being the full possible delay range, the receiver comprising:
   a path searcher module having interoperable hardware and software components, the path searcher module adapted to search repetitively for new multipath components, the path searcher module further adapted to perform each search for new multipath components in a search window constituting a subset of the range of possible delays, and to position the search window based on at least one previous delay profile ($g(\tau_i)$); and
   a delay estimator module having interoperable hardware and software components, the delay estimator module coupled to an output of the path searcher module and adapted to estimate the individual delays and calculate a delay profile ($g(\tau_i)$) repetitively, the receiver further adapted to include an artificial multipath component ($g''_7$) in the at least one previous delay profile at a delay value ($\tau_7$) on which a multipath component from an earlier delay profile is significantly decreased in the at least one previous delay profile.

3. A receiver adapted to detect multipath components in a time-varying fading radio channel in a digital wireless communications system in which individual multipath components of a signal transmitted through the channel are received with individual delays ($\tau$) within a range ($\tau_1 \ldots \tau_M$) of possible delay values, where for each individual delay ($\tau_i$), i is an element of [1, M] with [1, M] being the full possible delay range, the receiver comprising:
   a path searcher module having interoperable hardware and software components, the path searcher module adapted to search repetitively for new multipath components, the path searcher module further adapted to perform each search for new multipath components in a search window constituting a subset of the range of possible delays, and to position the search window based on at least one previous delay profile ($g(\tau_i)$); and a delay estimator module having interoperable hardware and software components, the delay estimator module coupled to an output of the path searcher module and adapted to estimate the individual delays and calculate a delay profile ($g(\tau_i)$) repetitively, wherein the receiver executes an algorithm adapted to determine the sums of power ($P_k$) for all possible search window positions.

* * * * *

UNITED STATES PATENT AND TRADEMARK OFFICE
CERTIFICATE OF CORRECTION

| | |
|---|---|
| PATENT NO. | : 7,826,515 B2 |
| APPLICATION NO. | : 10/558613 |
| DATED | : November 2, 2010 |
| INVENTOR(S) | : Andres Reial |

It is certified that error appears in the above-identified patent and that said Letters Patent is hereby corrected as shown below:

On Title Page, in item (56), under "OTHER PUBLICATIONS", in Column 2, Line 1, delete "PCt/" and insert -- PCT/ --, therefor.

In Column 11, Line 38, delete "$g'_1$" and insert -- $g'_1$ --, therefor.

In Column 11, Line 55, delete "$(\tau_i=\tau_0+i\Delta d).$" and insert -- $(\tau_i=\tau_0+i\Delta\tau).$ --, therefor.

In Column 13, Line 32, delete "range" and insert -- range. --, therefor.

In Column 14, Line 50, in Claim 2, delete "$(g(\tau_i)$" and insert -- $(g(\tau_i))$ --, therefor.

In Column 16, Line 3, in Claim 3, delete "$(g(\tau_i)$" and insert -- $(g(\tau_i))$ --, therefor.

Signed and Sealed this
Eighteenth Day of January, 2011

David J. Kappos
*Director of the United States Patent and Trademark Office*